Patented Dec. 12, 1950

2,534,204

UNITED STATES PATENT OFFICE 2,534,204

METHOD OF PREPARING AMIDES

David T. Mowry, Dayton, Ohio, assignor to Monsanto Chemical Company, St. Louis, Mo., a corporation of Delaware No Drawing. Application December 30, 1947, Serial No. 794,814

4 Claims. (Cl. 260—404.5)

This invention relates to a novel method for the preparation of aliphatic methylene bis (acyl amides) and particularly the waxlike compositions in which the acyl group contains 8 to 20 carbon atoms.

The prior art method of preparing the compositions involves the reaction of formaldehyde with two molecular equivalents of an aliphatic acid amide. Since the nitriles are less expensive and more easily purified than the corresponding acid amides, it will be apparent that a method of producing aliphatic methylene bis (acyl amides) directly without forming the intermediate acid amide would be desirable. Accordingly, the primary purpose of this invention is to provide a novel method of preparing useful compositions by a simplified direct method to replace the more costly two step method presently used.

In accordance with this invention it has been discovered that aliphatic nitriles or cyanoalkanes, and cyano-alkenes, can be reacted with one-half of a molecular equivalent of formaldehyde to form the difunctional amides. In the practice of this invention monomeric formaldehyde, paraformaldehyde, or formaldehyde in other polymeric form may be used. The reactions may be prepared in aqueous suspension, and some moisture is usually desirable. Frequently it is desirable to have present an organic solvent, such as dioxane, hexane and an organic acid, such as formic, acetic or propionic acid. It is necessary to catalyze the reaction by means of a strong mineral acid, for example hydrochloric acid, phosphoric acid, sulfuric acid, or an acidic substance which forms a strong mineral acid upon hydrolysis, such as boron fluoride and aluminum chloride. Generally one molecular equivalent, based on the nitrile, of the acid is required, but 0.2 to 2.0 mole equivalents may be used. By "strong acid" it is intended to include all acids having an ionization constant at least as great as that of phosphoric acid.

Although this invention may be used to prepare the difunctional methylene amide derivatives from all aliphatic nitriles, the use of the invention in the preparation of the higher molecular weight derivatives is preferred, particularly those nitriles which contain from 8 to 24 carbon atoms. Suitable nitriles for the practice of this invention are stearonitrile, behenonitrile, lauronitrile, myristonitrile, palmitonitrile, arachidonitrile, margaronitrile, capronitrile, caprylonitrile and mixtures of nitriles prepared from mixtures of fatty acids derived by saponification of animal and vegetable oils.

The reaction which takes place in the practice of this invention is as follows:

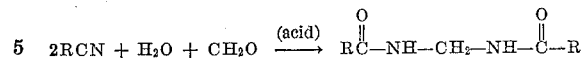

The compositions prepared by this new method are well known compositions useful as coating compositions for paper and textiles and for other applications where it is desired to impart water repellant properties to the materials being treated.

Further details of the practice of this invention are set forth in the following specific examples.

Example 1

A glass reaction vessel was charged with 7.9 grams of paraformaldehyde dissolved in 30 cc. of 90 percent sulfuric acid. While continuously agitating the reaction mass and cooling by circulation of cold water around the reaction vessel a solution of 133 grams of stearonitrile in 200 ml. of propionic acid was gradually added. Throughout the reaction the temperature of the reaction mass was maintained between 40–50° C. After the reactants had been combined the reaction mass was stirred for one hour and permitted to stand overnight. After quenching the reaction mass with water it was filtered, washed with sodium carbonate solution until neutral and finally washed with water. The product was a waxy, crystalline solid material M. P. 131–135° C., and was obtained in quantitative yield. It was identified as methylene bis stearamide having the structural formula:

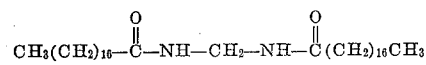

Example 2

A solution of 91 parts of lauronitrile and 7.5 parts of trioxane in 150 parts of acetic acid was treated with 100 parts of an ether solution of boron trifluoride which contained 7.7 percent boron. After heating for three hours at 30–35° C., the product was quenched with water. An excellent yield of methylene bis lauromide, M. P. 154–155° C. was obtained.

Example 3

By a method analogous to that given in Example 1, palmitonitrile was converted to methylene bis palmitamide in excellent yield. The product melted at 139–140° C.

Example 4

A glass reaction vessel was charged with 63 grams of a crude (90%) caprylonitrile, 7.5 grams of trioxane and 0.2 gram of a mixture of alkylbenzene sulfonic acids (average 12 carbon atoms in alkyl group). A 150 cc. quantity of concentrated hydrochloric acid was added and the mixture stirred for three and one-half hours at a temperature between 40 and 50° C. An exothermic reaction was thereby initiated which carried the temperature to 75° C. for about 15 minutes. The reaction mass was poured into water, filtered and dried in a vacuum oven. The resulting methylene bis caprylamide was recrystallized from 600 cc. of absolute alcohol, a substantial yield of product, M. P. 164–165° C., thereby being obtained.

Example 5

A glass reaction vessel was charged with a mixture of nitriles derived from soybean oil and contained approximately 10 percent palmitonitrile, 10 percent stearonitrile, 35 percent oleonitrile and 45 percent linoleonitrile. The vessel was charged with 7.5 grams of trioxane dissolved in 150 cc. of glacial acetic acid and with 30 cc. of concentrated sulfuric acid dissolved in 50 cc. of glacial acetic acid. The mixture was heated at 30° C. for three hours and then at 40° C. for one-half hour. The resulting composition was poured into water and the solid precipitate washed with water and sodium bicarbonate solution. A mixture of methylene bis acrylamides was thereby obtained.

Although this invention has been described with respect to specific embodiment, it is not intended that the details shall be construed as limitations upon the scope of the invention except to the extent incorporated in the following claims.

Addendum

It has also been found that organic acids having ionization constants at least as great as that of phosphoric acid, including the aryl and alkaryl sulfonic acids and the alkyl half esters of sulfuric acid are useful as catalysts in the practice of this invention.

I claim:

1. A method of preparing a compound of the structural formula:

wherein R is an alkyl radical having from 7 to 23 carbon atoms, which comprises treating an alkyl cyanide having from 8 to 24 carbon atoms with formaldehyde and an acidic substance of the group consisting of mineral acids having ionization constants at least as great as that of phosphoric acid and hydrolyzable salts of said acids, and contacting the resulting product with water.

2. A method of preparing methylene bis stearamide which comprises treating stearonitrile with formaldehyde and an acidic substance of the group consisting of mineral acids having ionization constants at least as great as that of phosphoric acid and hydrolyzable salts of said acids and contacting the resulting product with water.

3. A method of preparing methylene bis lauramide which comprises reacting lauronitrile with formaldehyde and an acid substance of the group consisting of mineral acids having ionization constants at least as great as that of phosphoric acid and hydrolyzable salts of said acids, and contacting the resulting product with water.

4. A method of preparing a mixture of methylene bis acylamide which comprises reacting a mixture of saturated nitriles having 8 to 24 carbon atoms with formaldehyde and an acidic substance of the group consisting of mineral acids having ionization constants at least as great as that of phosphoric acid and hydrolyzable salts of said acids at a temperature not greater than 50° C., and contacting the resulting product with water.

DAVID T. MOWRY.

REFERENCES CITED

The following references are of record in the file of this patent:

UNITED STATES PATENTS

| Number | Name | Date |
| --- | --- | --- |
| 2,173,005 | Strain | Sept. 12, 1939 |
| 2,279,497 | Sallmann et al. | Apr. 14, 1942 |
| 2,338,177 | Graenacher et al. | Jan. 4, 1944 |
| 2,365,813 | Gluesenkamp | Dec. 26, 1944 |
| 2,386,140 | Rogers | Oct. 2, 1945 |

OTHER REFERENCES

Bruylants et al.: Bull. Acad. Royale Belgique de la Classe de Sciences, Series 5, vol. 13 (1927), pages 767, 768, 776 and 779.

Sidgwick: Organic Chemistry of Nitrogen (1937), page 139.